UNITED STATES PATENT OFFICE.

WILLIAM D. COOLIDGE, OF SCHENECTADY, NEW YORK, ASSIGNOR TO GENERAL ELECTRIC COMPANY, A CORPORATION OF NEW YORK.

PRODUCTION OF REFRACTORY CONDUCTORS.

1,077,674.      Specification of Letters Patent.      Patented Nov. 4, 1913.

No Drawing.      Application filed September 23, 1908. Serial No. 454,452.

*To all whom it may concern:*

Be it known that I, WILLIAM D. COOLIDGE, a citizen of the United States, residing at Schenectady, in the county of Schenectady, State of New York, have invented certain new and useful Improvements in the Production of Refractory Conductors, of which the following is a specification.

This invention relates to the production of refractory electrical conductors suitable for use in incandescent lamps, electric furnaces, and other apparatus, and comprises a process whereby refractory material, even though non-ductile, may be shaped into wires, plates, rods, tubes, or other forms, and then treated to produce coherent conductors capable of converting electrical energy into heat and light at enormously high temperatures.

According to my present invention, a refractory element, alloy, compound or mixture is incorporated in a metallic binder, and the product so obtained is squirted or otherwise shaped into rods, filaments, or the like, and then treated to dry it out, that is, to bring it to such a state that subsequent heating will not make it soft; after which the rods or filaments are still further treated to free them from all easily vaporizable components and to sinter together the refractory residue into a coherent conductor.

As a binding material I may use various cadmium alloys capable of impregnation with refractory powder and capable of subsequent extrusion through a die without separation of some component of the mixture, and, finally, capable of removal from the refractory powder to leave behind a coherent conductor free from easily vaporizable material. As such an alloy, I may use one containing cadmium, mercury, and bismuth. This alloy may have the following proportions,—cadmium 44%, mercury 44% and bismuth 12%. This binder does not appear to chemically combine with the refractory material with which it is impregnated, and, consequently, the process of manufacture is applicable to all the materials above mentioned and to many others.

In general, the binding material serves to give the mixture plasticity and strength, and in some cases to increase its electrical conductivity, and is retained in the mixture only until the body has been worked or formed into the desired shape. It is then taken out by suitable treatment and leaves behind a refractory coherent wire, rod, tube, or the like.

In order that my invention may be easily practised, I have hereinafter described the process as applied to the metal tungsten, and as applied to a metal binder of cadmium-bismuth-amalgam, but this specific embodiment is to be regarded as only typical and as showing but one of numerous ways of utilizing my invention.

Tungsten suitable for use according to my present process may be made by reduction of tungsten trioxid with hydrogen according to the general process well-known to chemists, except, however, that the reaction should preferably be so conducted that the resulting tungsten is in a very finely divided condition. To obtain this result, I find it desirable to use very fine tungsten trioxid and to treat this oxid at a relatively high temperature using a large quantity of hydrogen.

To compound the binder for use with tungsten or other refractory powder, I melt together the bismuth, cadmium and mercury in the proportions above mentioned. I find that the mixture melts considerably lower than the temperature at which cadmium oxidizes in air, and I find that the alloy is smooth, and when partially cooled is plastic and may be readily impregnated with tungsten powder by simply rubbing the two together with a pestle in a chemist's mortar. The tungsten may be added to the extent of 30 to 40% by weight of the final mixture. I call the product a mixture because I do not at present believe that the tungsten alloys or combines in any way with the material of the binder. The mixture is tenacious and pliable and can be readily rolled or worked by well-known metal-working processes.

To obtain wires suitable for the construction of incandescent lamp filaments, I squirt the plastic composite mixture above mentioned through a diamond die at a temperature of 100 to 150 degrees C. The material comes out as a smooth silver white wire, very strong, pliable and tough. It can be squirted in sizes varying from large rods down to wires having a diameter of one mil or even less. After cutting these ductile wires to proper length and bending into loops having the shape of lamp filaments they are treated to dry out the binder and to put the conductors in such condition that they will not become unduly soft when heated above the liquefying temperature of the remaining binding agent. To effect this drying operation I may follow any one of the several methods hereinafter described, each of which has some advantages.

According to one method of procedure the filament-shaped loops are placed in bundles on a piece of wire gauze supported in a relatively small glass tube heated externally, as by a gas flame, and are there subjected to a current or blast of hydrogen or other gaseous or vaporous fluid capable of drying out and carrying away some of the warm binder. It is my present opinion that during this drying operation some, or possibly all, of the mercury sublimes or evaporates and is taken up by the blast of hydrogen or other fluid and so carried away before it has formed large globules which might pit the surface of the wires by amalgamation or alloying with the binder immediately adjacent.

If hydrogen is used as the drying agent, I prefer not to let it go to waste after once passing the filaments, but instead, I return it to the tube over and over again, as by means of a suitable circulating pump. The pressure of the hydrogen in the tube may vary anywhere from atmospheric to almost zero and, apparently, the faster it circulates, the more rapidly is the mercury or similar component removed from the wires under treatment.

I have suggested hydrogen as the gaseous material for the blast, but nitrogen is also suitable, or a mixture of nitrogen and hydrogen may be used. These materials are substantially inert with respect to the wires and their drying power is probably due largely to their ability to physically remove the metal of the binder. But it is possible to secure the desired drying-up of the wires by fluids much less inert, such as air or dry steam. The use of these materials has the advantage of cheapness, as they can be allowed to go to waste, and there is no necessity for condensing the suspended mercury. Of course, the mercury vapor ought not to be discharged into the room where the operators are at work, as it is injurious to health.

When air or steam is used as the drying agent, a second action comes into play because of the chemical reaction between the drying fluid and the wires under treatment. Air or steam will tend to oxidize the cadmium somewhat, but this oxidation, instead of being harmful, is in truth helpful, since the formation of cadmium oxid means the removal of a liquid element from the wire and the production in its place of a dry powder, namely, cadmium oxid, which still further dries out the wire. Even in case the treatment with fluid is carried so far as to oxidize some of the tungsten, no trouble need arise therefrom if the filaments are subsequently sintered in hydrogen, as by means of external heat. As hereinafter described, this procedure reduces the tungsten oxid to metal, and the resulting product is the same as if no oxidation had occurred.

If desired, the heat necessary for most advantageous operation of the process may be applied, not only to the tube containing the wires, but also to the circulating fluid before it enters the baking or drying tube.

In case air or steam is used as the drying fluid, it need not be circulated so rapidly as in the case of the inert hydrogen or nitrogen. This is due, of course, to the fact that the vaporizing action of the air or steam is supplemented by their chemical action on the wires. Though I consider it best to supply the air or steam as a blast or circulating current, the speed of circulation can profitably be regulated to suit the particular temperature of treatment and the chemical activity of the treating fluid with respect to the particular metals under treatment.

By the substitution of other fluids for the air or steam, it is possible to dispense entirely with the circulating features and to depend solely on the chemical action of the treating fluid. Thus, if the wires be subjected to the action of acid fumes, they can be dried out sufficiently for the purpose at hand, even though the fumes be not circulated over the wires to any appreciable extent. As suitable gaseous re-agents for this work I may use hydrochloric acid, chlorin, bromin, hydrogen sulfid or ozone either at atmospheric pressure or at reduced pressure and I may continue the treatment with the re-agent until the wires are dried out to the desired extent, namely, to such a degree as to permit the necessary high heat treatment without softening. It is my present understanding that the action produced by these gaseous re-agents consists in the formation of solid compounds in the warm or heated wires in place of the metals which might otherwise ooze out on the surface and form flaws or pits by alloying with the metal binder immediately adjacent. Some of these re-agents may be used at room temperature, in which case supplemental heating is not necessary.

It may be understood that wires treated by the above enumerated chemical re-agents no longer consist solely of metal, but contain also other elements or compounds. Consequently, subsequent steps of the treatment should be carried out with the view to decomposition or easy removal of all these compounds.

As an alternative method of procedure for effecting the necessary drying action, I may proceed by baking the wires in a packing of metal in a very finely divided state and capable of uniting readily with the mercury, or with both the mercury and cadmium. Copper, aluminium, zinc, or tin is suitable for this work. The baking or heat treatment in the powdered metal can be carried out in vacuum or in an inert gaseous atmosphere. It is my present understanding that the untreated wire is a porous net-work of tungsten filled with binder, and that, on heating to the softening point, capillary forces push out large quantities of the liquefied binder with the production of large globules at the surface of the wire. The use of a packing of finely divided metal capable of uniting readily with the exuded mercury prevents formation of these globules and permits carrying the filaments through that somewhat delicate stage wherein they tend to soften to a troublesome extent as the temperature is raised. With that portion of the binder which would otherwise tend to form globules removed, there is no apparent need for further preliminary baking or drying and the wires can immediately be subjected to the final or finishing treatment, though, if desired, the drying or baking process can be carried further, and more of the binder removed by alloying with the metal packing or by direct volatilization. The metal packing can be brushed from the filaments or wires after the drying treatment, and what little remains sticking to them can be volatilized off in the subsequent firing operation. The packing of finely divided metal serves so completely to protect the wires that it is even possible to bake them in open boats heated in air.

As a still further modification of the drying or baking operation, I may pack the wires in very finely divided inert powders, such as alumina, magnesia, calcium carbonate, cupric oxid, silica, tungsten, carbon, or manganese-dioxid. The inert powder should be exceedingly fine and should be well shaken about the wires so that every bit of the surface of the wires is covered with the packing material. Baking may then take place as usual, either in a vacuum or a gaseous atmosphere, such as hydrogen. The very finely divided packing seems in some way to prevent the formation of harmful globules, even in a quiet gas at atmospheric pressure. The baking operation may be stopped at any time after removal of such proportion of the components of the metal binder as would otherwise render the wires too wet for the direct application of high temperature treatment. During this drying or baking operation, whether carried out by the use of a strong blast of inert gas, or by a chemical re-agent either quiescent or circulating, or by heating in fine powder, either inert or chemically active, so much of the mercury and cadmium should be taken out of the wires, or replaced by oxid or other compound, that the wires can then be put through the finishing high heat treatment without danger of softening up to a troublesome extent because of liquefaction of the binder.

The final or firing treatment may be carried out in one of several ways, as, for instance, by heating with current in a vacuum or in an atmosphere of hydrogen or hydrogen and nitrogen, containing the heat treatment until all easily vaporizable components are removed from the wire and until the refractory residue of tungsten or other material is sintered and shrunk into a strong, coherent conductor suitable for use in electric lamps. But it is sometimes advantageous to effect this final operation by treating the filaments with heat from an external source, as by heating in a tubular resistance furnace operated at high temperature, and, if necessary, supplied with an inert or chemically active gas. The use of such a furnace is particularly advantageous in case the baking or drying treatment has left in the wires some oxid, chlorid, or other compound, requiring the use of a reducing agent for its convenient removal.

While my invention is described with particular reference to the manufacture of tungsten filaments, I have found by investigation and therefore wish it to be understood that it is of general application to other refractory metals and materials, such, for example, as molybdenum, graphite, or the like.

Having now fully described my invention, what I claim as new and desire to secure by Letters Patent of the United States, is:

1. The method which consists in heating a molded article comprising a refractory powder and a metal binder in the presence of means for progressively taking up at least some of the more easily fusible portion of said binder to stiffen the article and prevent its undue softening when heated to a higher temperature.

2. The method of preparing an unfinished lamp filament comprising refractory material and an amalgam binder for high heat treatment which consists in heating the same in a stream of fluid to remove part of the binder, and regulating the rate of flow of said fluid to prevent the formation of surface globules.

3. The method which consists in heating articles comprising refractory material and an amalgam binder in a strong current of gas to progressively remove some of the metal binder and finally heating by heat generated externally to a higher temperature to complete the removal of the binder and consolidate the residue.

4. In the process of making tungsten filaments the step which consists in heating a shaped wire of tungsten powder and a binder of cadmium, mercury and bismuth in a current of gas to remove exuded metal and prevent the formation of surface globules.

5. The method of hardening shaped articles comprising refractory material and an amalgam binder which consists in heating in the presence of means for removing exuded metal from the surface at a rate which will prevent large globules from forming on the surface of said body.

In witness whereof, I have hereunto set my hand this 21st day of September 1908.

WILLIAM D. COOLIDGE.

Witnesses:
BENJAMIN B. HULL,
MARGARET E. WOOLLEY.

---

It is hereby certified that in Letters Patent No. 1,077,674, granted November 4, 1913, upon the application of William D. Coolidge, of Schenectady, New York, for an improvement in the "Production of Refractory Conductors," an error appears in the printed specification requiring correction as follows: Page 3, line 76, for the word "containing" read *continuing;* and that the said Letters Patent should be read with this correction therein that the same may conform to the record of the case in the Patent Office.

Signed and sealed this 9th day of December, A. D., 1913.

[SEAL.]

J. T. NEWTON,

*Acting Commissioner of Patents.*